US012661815B2

(12) United States Patent
Cheng

(10) Patent No.: US 12,661,815 B2
(45) Date of Patent: Jun. 23, 2026

(54) FOLDING KNIFE WITH POSITIONING MECHANISM AND ELASTIC BAR

(71) Applicant: Kantas Products Co., Ltd., Taipei City (TW)

(72) Inventor: Yang-Fu Cheng, Taipei City (TW)

(73) Assignee: Kantas Products Co., Ltd., Taipei City (TW)

( * ) Notice: Subject to any disclaimer, the term of this patent is extended or adjusted under 35 U.S.C. 154(b) by 83 days.

(21) Appl. No.: 18/826,995

(22) Filed: Sep. 6, 2024

(65) Prior Publication Data

US 2025/0360635 A1 Nov. 27, 2025

(30) Foreign Application Priority Data

May 24, 2024 (TW) ................................ 113205343

(51) Int. Cl.
*B26B 1/04* (2006.01)

(52) U.S. Cl.
CPC .................................... *B26B 1/046* (2013.01)

(58) Field of Classification Search
CPC ......... B26B 1/046; B26B 1/044; B26B 1/042; B26B 1/04; B26B 1/02
USPC ......... 30/155, 137, 153, 157, 158, 159, 160, 30/161, 308.2, 321, 330, 341, 342, 517, 30/519; 7/118, 128, 129, 168; 81/117.4, 81/319, 427.5
See application file for complete search history.

(56) References Cited

U.S. PATENT DOCUMENTS

| | | | | |
|---|---|---|---|---|
| 6,256,888 B1 * | 7/2001 | Shuen | B26B 1/048 | 30/160 |
| 6,941,661 B2 * | 9/2005 | Frazer | B26B 1/048 | 30/160 |
| 7,243,430 B1 * | 7/2007 | Lerch | B26B 1/046 | 30/159 |
| 7,275,321 B2 * | 10/2007 | Cheng | B26B 1/044 | 30/158 |
| 7,278,213 B2 * | 10/2007 | Pardue | B26B 1/04 | 30/159 |
| 7,302,760 B2 * | 12/2007 | Lake | B26B 1/046 | 30/159 |
| 7,480,997 B2 * | 1/2009 | Ping | B26B 1/046 | 30/159 |
| 7,543,386 B2 * | 6/2009 | Sullivan | B26B 1/046 | 30/160 |
| 8,893,389 B2 * | 11/2014 | Freeman | B26B 1/046 | 30/155 |

(Continued)

*Primary Examiner* — Ghassem Alie

(57) ABSTRACT

A folding knife having a positioning mechanism includes a blade having a passage-allowing groove, a handle pivotally connected to the blade, an elastic bar fixable in the handle, an engaging portion mountable in the handle, and a positioning portion. When stored in the handle, the blade is applied by the elastic bar with a rotating force that pushes it along a direction out of the handle. The engaging portion keeps the blade stored in the handle from being rotated outward when the engaging portion's pressing unit is not pressed; and is disengaged from the passage-allowing groove's groove wall when the pressing unit is pressed, so that the blade can be pushed by the elastic bar and rotated out of the handle. When the blade is rotated into a working-unfolded state, the positioning portion can be extended into a positioning groove of the blade to prevent the blade from rebounding.

8 Claims, 13 Drawing Sheets

(56) References Cited

U.S. PATENT DOCUMENTS

| | | | | |
|---|---|---|---|---|
| 10,035,272 | B2 * | 7/2018 | Bruhns | B26B 1/044 |
| 2006/0230620 | A1 * | 10/2006 | Steigerwalt | B26B 1/046 30/159 |
| 2007/0169354 | A1 * | 7/2007 | Ralph | B26B 1/048 30/160 |
| 2013/0291389 | A1 * | 11/2013 | Chen | B26B 1/048 30/158 |
| 2021/0154868 | A1 * | 5/2021 | Lau | B26B 1/048 |

* cited by examiner

FOLDING KNIFE WITH POSITIONING MECHANISM AND ELASTIC BAR

CROSS-REFERENCE TO RELATED PATENT APPLICATION

This non-provisional application claims priority to and the benefit of, under 35 U.S.C. § 119(a), Taiwan Patent Application No. 113205343, filed May 24, 2024 in Taiwan. The entire content of the above identified application is incorporated herein by reference.

FIELD

The present disclosure is related to a folding knife, and more particularly to a folding knife that uses an elastic bar as the source of force for pushing a blade, and has a positioning portion to keep the blade in a working-unfolded state, preventing the blade from rebounding due to a reaction force.

BACKGROUND

All the commercially available folding knives are composed of a handle and a blade, wherein the blade and the handle are pivotally connected so that the blade can be rotated around the pivotal connection point either out of the handle or back into the handle for storage. A folding knife in a folded state has a relatively small volume and therefore can be easily carried around, with the blade stored in the handle to provide a higher level of carrying safety. This explains why for users such as divers, outdoor activity enthusiasts, soldiers, and the police, folding knives are more convenient than knives whose blade cannot be folded away.

Nowadays, a folding knife typically uses a volute spring as the source of force for pushing the blade. The volute spring is mounted where the blade and the handle are pivotally connected, and each of the two ends of the volute spring presses against one or the other of the blade and the handle in order to generate a force that always tends to push the blade outward. A user only has to unlock the blade locking mechanism, and the blade will spin out automatically due to the force of the volute spring. Accordingly, such a spring-loaded knife can be used promptly and single-handedly to deal with an emergency in a special or urgent situation. For example, a fisherman who is in a diving operation and has one hand caught in a fishing net may use such a spring-loaded knife to cut off the fishing net immediately so as to escape from danger and protect his or her life from a deadly threat.

A conventional volute spring-loaded folding knife nevertheless has the following problems:

(1) To make it easier for a user to carry such a folding knife around or put it away, it is common practice for such a folding knife to have a relatively small-volume design, and because of that, the volume of the volute spring has to be reduced as well. As the volute spring is formed by winding a linear wire or planar material into a spiral shape, the relatively small volume adds to the difficulty of production.

(2) During assembly, it is difficult to fix a relatively small volute spring precisely at the position where the blade is pivotally connected to the handle. The difficulty not only prolongs the production time, but also increases the defective rate of the product.

(3) In order to be able to mount the volute spring in the handle, the thickness of the handle must be increased so that the volute spring can be put into the handle. The increased thickness, however, works against the design principle of folding knife volume reduction, and the dilemma undoubtedly increases the difficulty of design. Moreover, a relatively thick handle is disadvantageous to gripping, which is especially true for users with relatively small palms.

(4) Each of the two ends of the volute spring must press against one or the other of the blade and the handle in order to generate a force for pushing the blade outward, and to this end, one current approach is to form a groove in the pivot shaft of the handle so that one end of the volute spring can be held in the groove of the pivot shaft in a hooked manner while the other end of the volute spring is hooked to the blade. The required assembly process, however, is not only complicated but also difficult to perform. The hooking operations, in particular, can be strenuous when the volume of the folding knife is relatively small.

According to the above, it can be known that the use of volute springs has indeed caused production troubles to folding knife manufacturers, and incurred extra labor and cost. How to effectively solve the above-referenced inadequacies is therefore one of the issues addressed in the present disclosure.

SUMMARY

As there is still room for improvement for the structure of a conventional spring-loaded knife with a volute spring, as a result of longtime research and experiment, a folding knife with a positioning mechanism and an elastic bar is provided in the present disclosure, in which the effect of the volute spring is replaced by that of the elastic bar, so as to effectively solve conventional problems and provide users with better use experience.

Certain aspects of the present disclosure are directed to a folding knife with a positioning mechanism and an elastic bar. The folding knife includes a handle, a blade, the elastic bar, a positioning portion, and an engaging portion. The handle includes a first plate and a second plate. The inner side of the first plate is concavely formed with a groove. The second plate is formed with a through hole corresponding in position to the groove. The first plate or the second plate is formed with a first positioning groove. The blade can be located between the first plate and the second plate and has a pivotal connection end, a blade tip end, a passage-allowing groove and a second positioning groove. The pivotal connection end can be pivotally connected to a position of the handle that is adjacent to a first end of the handle, and be rotated out of the handle and rotated into the handle around the position where the handle and the blade are pivotally connected. The passage-allowing groove can correspond in position to the groove of the first plate when the blade is fully stored in the handle. The second positioning groove can correspond to the first positioning groove when the blade is rotated out of the handle and in an unfolded state. The elastic bar has a first end located at a position of the handle that is adjacent to a second end of the handle, and a second end at a position adjacent to the position where the handle and the blade are pivotally connected. The elastic bar can, when the blade is fully stored in the handle, press against the blade and apply a rotating force to the blade that pushes the blade along a direction out of the handle. The positioning portion can be disposed in the first positioning groove and, when the second positioning groove corresponds to the first positioning groove, be extended into the second positioning groove and prevent the blade from rebounding because of a reaction force. The engaging portion includes an engaging post and an elastic element. The engaging post includes, sequentially from one end of the engaging post to the other end of the engaging post, a pressing unit, a position-limiting unit, a passage-allowing unit, and an engaging unit. The pressing unit can be extended into the through hole from the inner side of the second plate and be exposed from the outer side of the second plate. The greatest length of the position-limiting unit in the transverse direction is greater than the hole diameter of the through hole, so as to prevent the engaging post from separating from the through hole. The engaging unit can be extended into the groove of the first plate and, when the pressing unit is pressed, be disengaged from the blade and prevented from being pressed against an outer edge of the blade, so that the blade is pushed by the elastic bar and rotated out of the handle till the positioning portion is extended into the second positioning groove, and a portion of the outer edge of the blade passes through an area corresponding to the groove of the first plate while the blade is being rotated outward. The greatest length of the passage-allowing unit in the transverse direction is less than the greatest length of the engaging unit in the transverse direction. The elastic element is located in the groove of the first plate and can push the engaging unit in a direction away from the groove of the first plate, and when the blade is stored in the handle and the pressing unit is not pressed, push the engaging unit and press the engaging unit against the outer edge of the blade, so that the blade is blocked by the engaging unit and prevented from being rotated outward. Accordingly, by using the elastic bar having a larger volume as the source of force for the blade of the folding knife, convenience in production and assembly can be effectively improved, and through the design of the positioning portion, the blade can stably stay at the working-unfolded state, thereby improving use safety and stability.

In certain embodiments, the engaging unit can be extended into the passage-allowing groove and pressed against a groove wall of the passage-allowing groove when the pressing unit is not pressed and the blade is stored in the handle, and be disengaged from the passage-allowing groove and leave the passage-allowing unit in the passage-allowing groove when the pressing unit is pressed, and the passage-allowing unit allows passage of the blade without being touched by the blade when the blade is rotated out of the handle around the position where the handle and the blade are pivotally connected.

In certain embodiments, a portion of the engaging unit that is adjacent to the passage-allowing unit has a trapezoidal longitudinal cross section, and the greatest width of the engaging unit is greater than a distance between any two opposite sidewall portions of the passage-allowing groove.

In certain embodiments, an engaging groove is concavely formed at a lateral edge of the blade, and the elastic element can, when the blade is rotated fully out of the handle and the pressing unit is not pressed, push the engaging unit and press the engaging unit against a groove wall of the engaging groove, so that the blade is blocked by the engaging unit from inward rotation.

In certain embodiments, an inner side of the first plate is protrudingly provided with a stop post, the blade is concavely formed with a stop groove at a position adjacent to the engaging groove, and the stop post is in the stop groove and abuts a groove wall of the stop groove when the blade is rotated fully out of the handle.

In certain embodiments, the positioning portion includes an elastic member and a positioning block. The elastic member can be disposed in the first positioning groove and have an elastic restoring force. The positioning block can be pushed and displaced by the elastic member, be driven by the elastic member to be extended into the second positioning groove when the second positioning groove corresponds to the first positioning groove, and be pressed by the blade and moved inward of the first positioning groove when the second positioning groove does not correspond to the first positioning groove.

In certain embodiments, the elastic member is a spring, and the positioning block is a ball.

In certain embodiments, the elastic member and the positioning block are integrally formed, and the elastic member is formed by bending or curving a plate at a specific angle and has the elastic restoring force.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
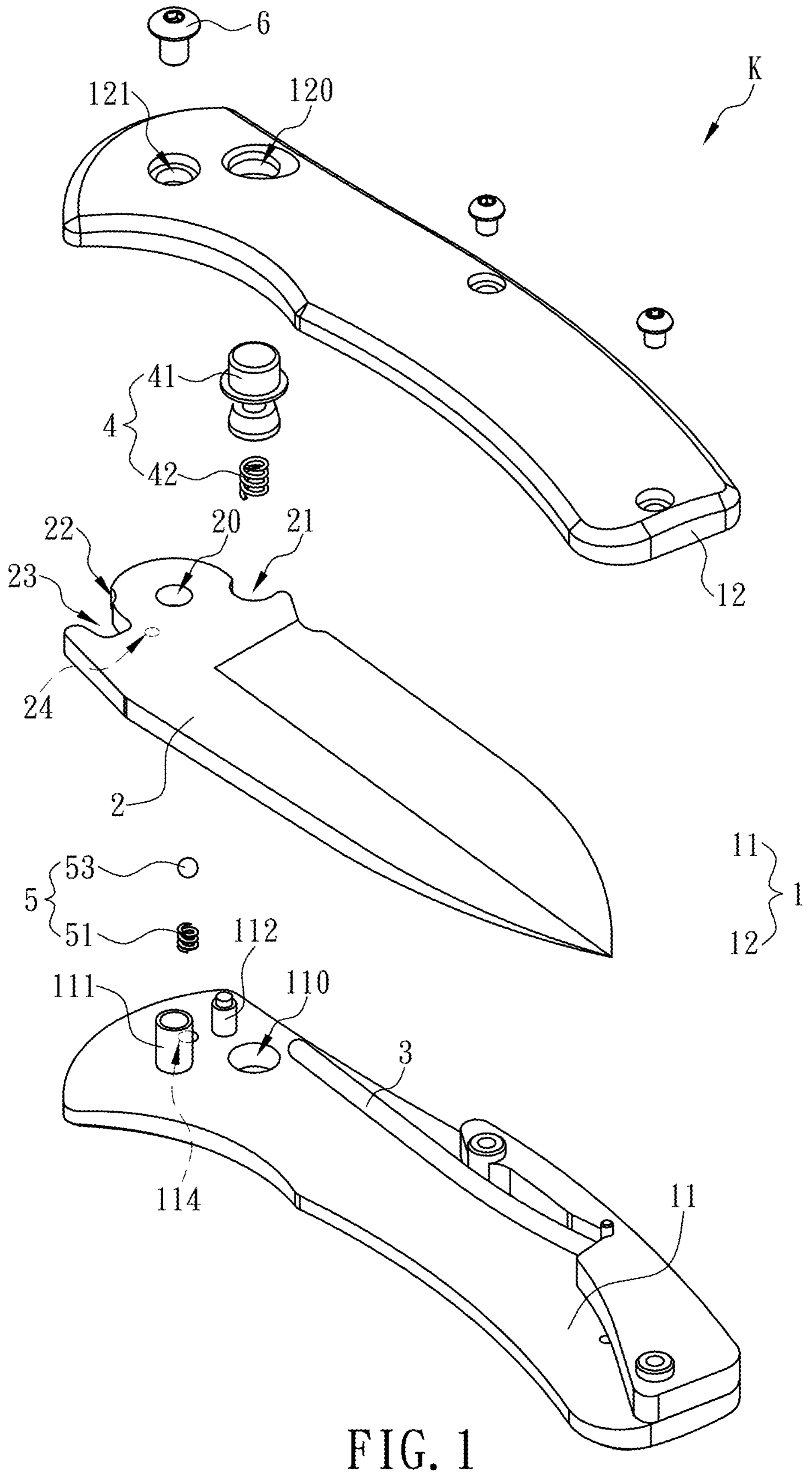
FIG. 1 is an exploded view of a folding knife according to certain embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like. Directional terms (e.g., "front", "rear", "left", "right", "upper/top" and/or "lower/bottom") are explanatory only and are not intended to be restrictive of the scope of the present disclosure.

Figure 2:
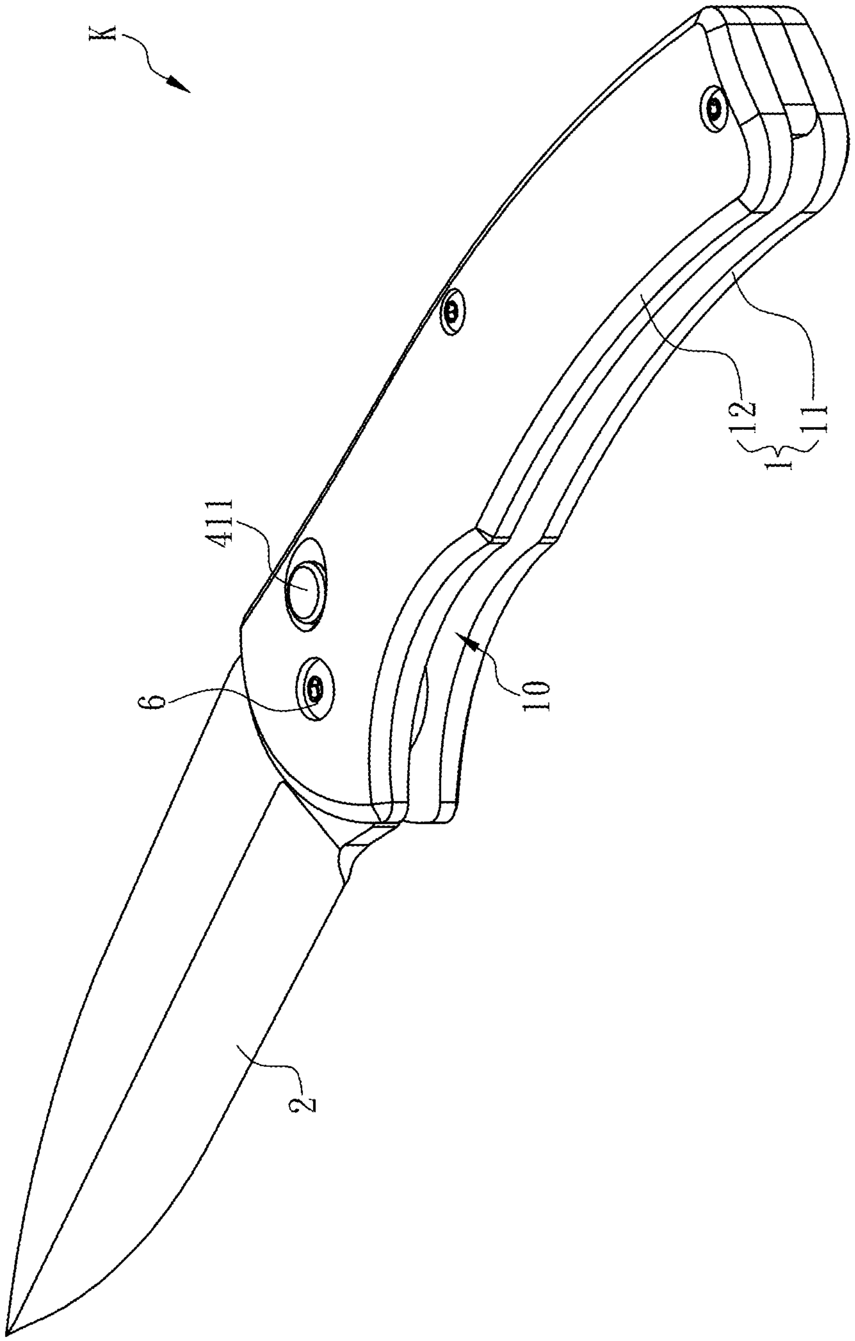
FIG. 2 is a schematic diagram showing that a blade of the folding knife is rotated fully out of a handle of the folding knife according to certain embodiments of the present disclosure.
Figure 3:
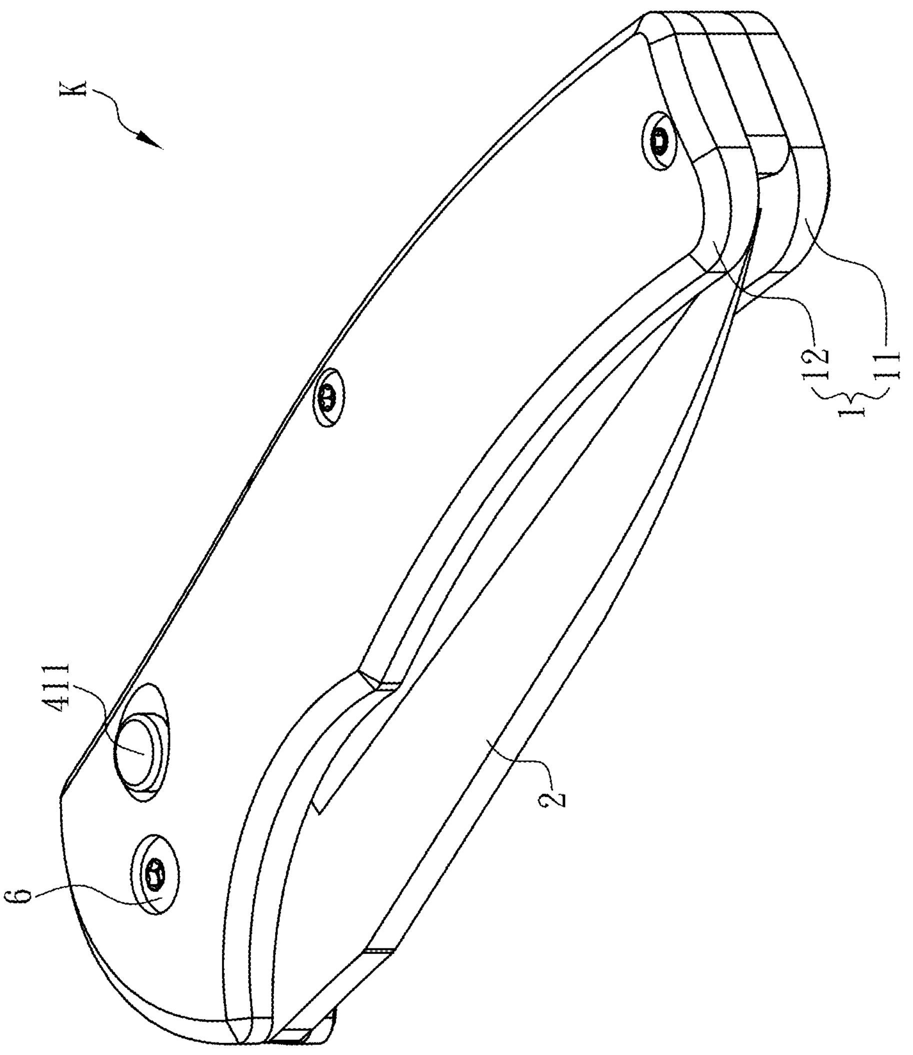
FIG. 3 is a schematic diagram showing that the blade of the folding knife is fully stored in the handle of the folding knife according to certain embodiments of the present disclosure.

Certain aspects of the present disclosure are directed to a folding knife that has a positioning mechanism and an elastic bar. Referring to FIG. 1 to FIG. 3, the folding knife K in certain embodiments includes a handle 1, a blade 2, an elastic bar 3, an engaging portion 4, and a positioning portion 5. The handle 1 includes a first plate 11 and a second plate 12, and has a receiving space 10 therein for receiving the blade 2 (as shown in FIG. 3). In certain embodiments, the inner side of the first plate 11 is concavely formed with a groove 110, and the second plate 12 is formed with a through hole 120 corresponding in position to the groove 110. The term "inner side" of a plate refers to the side that corresponds to and faces the receiving space 10 of the handle 1 when the two plates 11 and 12 have been put together to form the handle 1, and the term "outer side" of a plate refers to the side that faces away from the receiving space 10 of the handle 1. In FIG. 1 for example, the upward-facing side of the first plate 11 and the downward-facing side of the second plate 12 are the "inner sides," whereas the downward-facing side of the first plate 11 and the upward-facing side of the second plate 12 are the "outer sides."

With continued reference to FIG. 1 to FIG. 3, the blade 2 is configured to be mounted between the first plate 11 and the second plate 12. The blade 2 is elongated in shape and has two ends defined as a pivotal connection end and a blade tip end. The pivotal connection end is configured to be pivotally connected to a position of the handle 1 that is adjacent to one end (hereinafter referred to as the first end) of the handle 1, so that the blade 2 can be rotated about the pivotal connection position out of the handle 1 until the blade 2 is in the working-unfolded state shown in FIG. 2, with the blade tip exposed, and be rotated back into the handle 1 for storage (as shown in FIG. 3), with the blade tip stored in the handle 1. In certain embodiments, the inner side of the first plate 11 is provided with a pivot shaft 111 at a position adjacent to the first end of the handle 1, the second plate 12 is formed with a pivot hole 121 at a position corresponding to the pivot shaft 111, and the blade 2 is formed with a through bore 20. The pivot shaft 111 can pass sequentially through the through bore 20 and the pivot hole 121, and a screw 6 can be locked to the pivot shaft 111, so as to connect the blade 2 and the handle 1 together as a single unit (as shown in FIG. 2). In certain embodiments, the pivotal connection structure of the blade 2 and the handle 1 can be adjusted according to actual product requirements, without being limited to the foregoing configuration.

Figure 4:
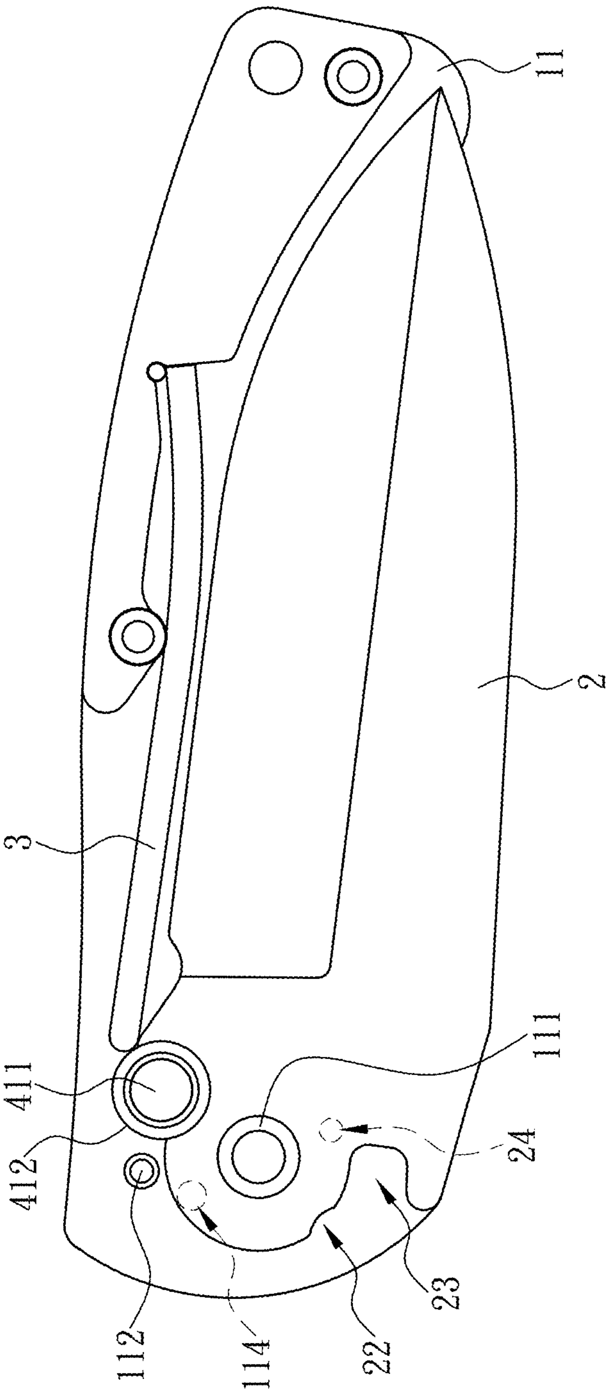
FIG. 4 is an assembled view of the folding knife in a folded configuration according to certain embodiments of the present disclosure, omitting a second plate thereof.

Referring to FIG. 1, the elastic bar 3 is located in the handle 1. One end (hereinafter referred to as the first end) of the elastic bar 3 is secured (e.g., through mechanical engagement) at a position of the handle 1 that is adjacent to the other end (hereinafter referred to as the second end) of the handle 1, and the other end (hereinafter referred to as the second end) of the elastic bar 3 is at a position adjacent to the position where the handle 1 and the blade 2 are pivotally connected. In certain embodiments, the length of the elastic bar 3 is about three fourths of the length of the handle 1, the first end of the elastic bar 3 is fixed at a position on the first plate 11 that is adjacent to the second end of the handle 1, and the second end of the elastic bar 3 is at a position adjacent to the groove 110. Referring to FIG. 4 (in which the second plate 12 is omitted), when the blade 2 is fully stored in the handle 1, the elastic bar 3 presses against the blade 2 and applies a rotating force to the blade 2 that pushes the blade 2 along a direction out of the handle 1, so that it can pushes the blade 2 to rotate out of the handle 1.

Figure 5:
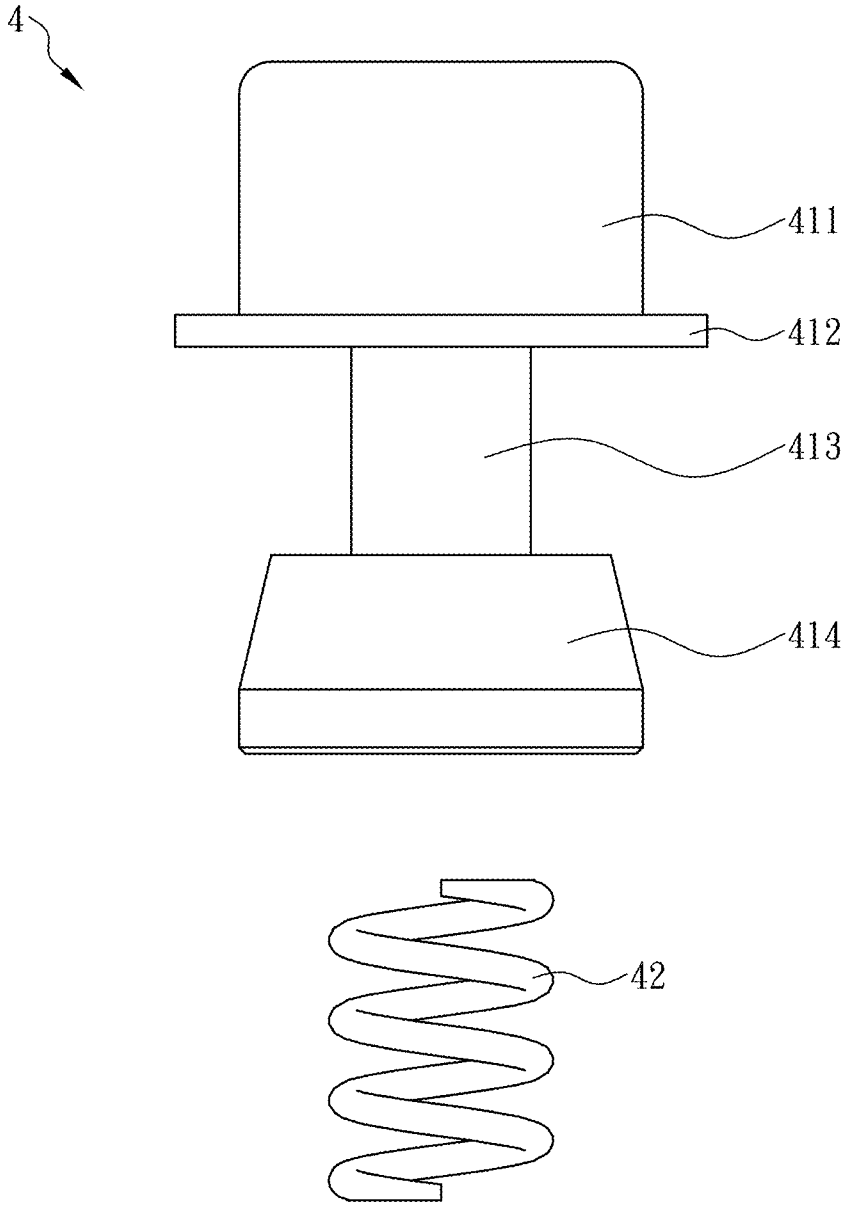
FIG. 5 is a schematic diagram of an engaging portion according to certain embodiments of the present disclosure.

Referring to FIGS. 1 and 5, the engaging portion 4 includes an engaging post 41 and an elastic element 42. The engaging post 41 includes, sequentially from one end to the other end thereof (e.g., in the downward direction in FIG. 5), a pressing unit 411, a position-limiting unit 412, a passage-allowing unit 413, and an engaging unit 414. In certain embodiments, the pressing unit 411 is configured to be extended into the through hole 120 from the inner side of the second plate 12 and be exposed from the outer side of the second plate 12 (as shown in FIG. 3), so that a user can press the pressing unit 411. The engaging unit 414 can be extended into the groove 110. The position-limiting unit 412 and the passage-allowing unit 413 are located in the storage space 10.

With continued reference to FIG. 1 and FIG. 5, the position-limiting unit 412 can be shaped as a thin plate, with its greatest length in the transverse direction greater than the hole diameter of the through hole 120 so that once the pressing unit 411 is extended into the through hole 120, the position-limiting unit 412 can abut against the inner side of the second plate 12 and thus be kept from being extended into the through hole 120, so as to prevent the engaging post 41 from separating from the through hole 120 and to help position the engaging post 41 in the handle 1. The passage-allowing unit 413 can be a thin cylinder, with its greatest length in the transverse direction (for example, the leftward-rightward direction in FIG. 5) less than the greatest length of the engaging unit 414 in the transverse direction and less than the hole diameter of the through hole 120 and/or the groove diameter of the groove 110. The elastic element 42 can be located in the groove 110, with its first end and second end pressing against the groove bottom of the groove 110 and the other end of the engaging post 41 (i.e., the engaging unit 414), respectively, such that the elastic element 42 can apply a force to the engaging post 41 that pushes the engaging unit 414 in a direction away from the groove 110.

Figure 6:
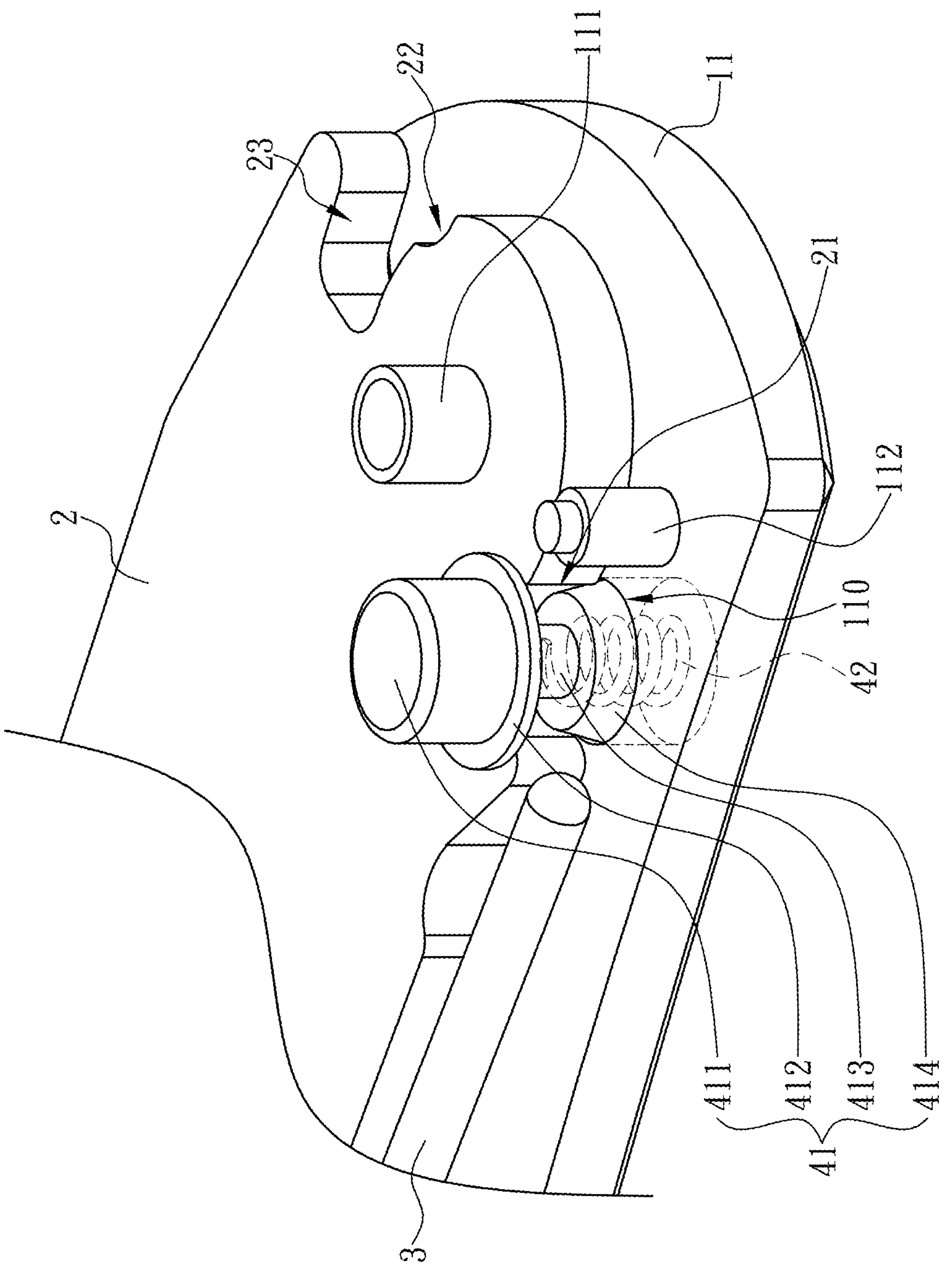
FIG. 6 is a perspective view of a portion of the folding knife in a folded configuration according to certain embodiments of the present disclosure, omitting the second plate thereof.
Figure 7:
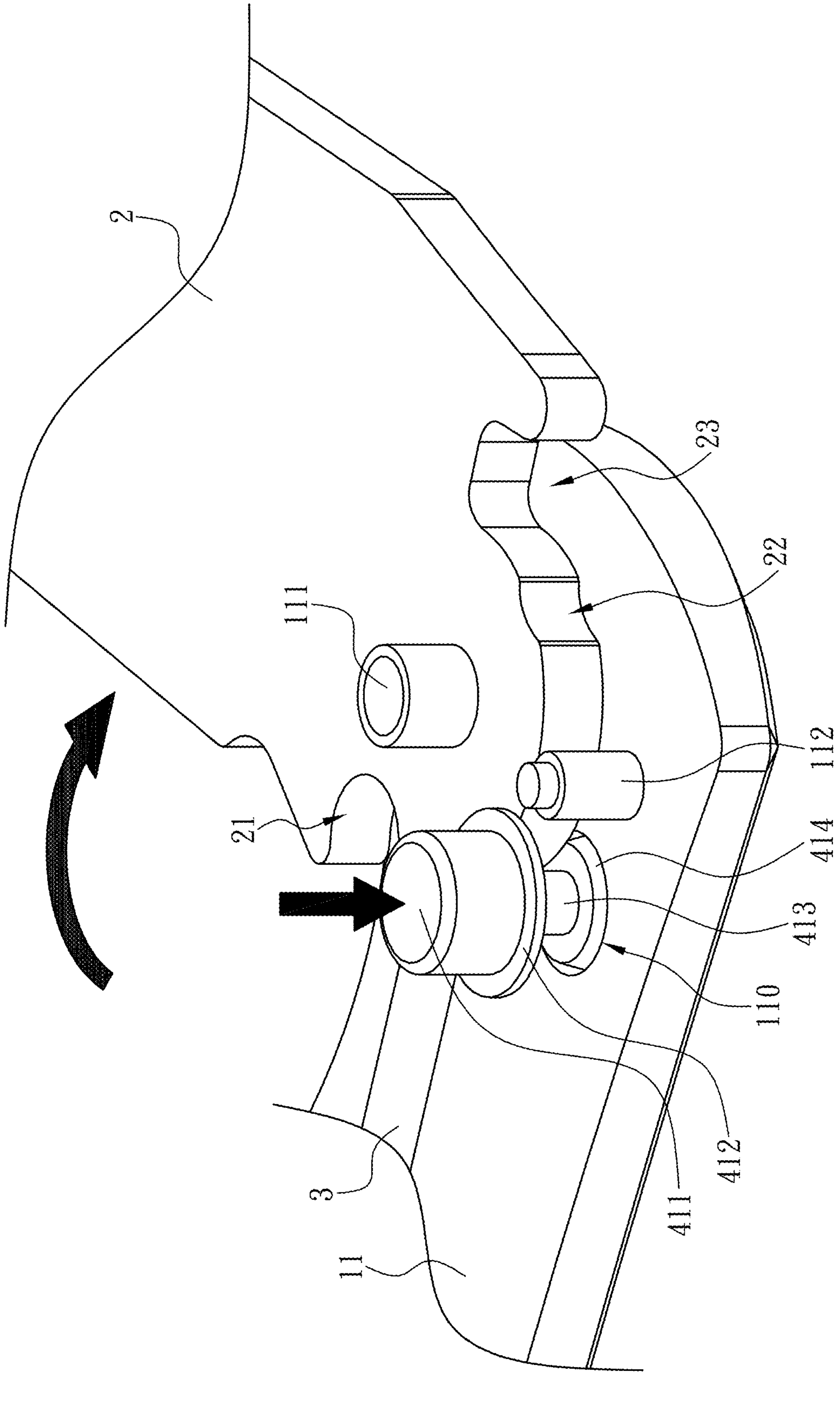
FIG. 7 is a perspective view of a portion of the folding knife when being unfolded according to certain embodiments of the present disclosure, omitting the second plate thereof.

Referring to FIGS. 1, 6 and 7, in which the second plate 12 is not shown in FIGS. 6 and 7 to facilitate description of the interaction between components, when the blade 2 is fully stored in the handle 1 and the pressing unit 411 is not pressed, the elastic element 42 pushes the engaging unit 414 such that a portion of the engaging unit 414 is pressed against the outer edge of the blade 2, that is, the engaging unit 414 provides a blocking force. As the blocking force provided by the engaging unit 414 is greater than the force with which the elastic bar 3 pushes the blade 2, the blade 2 is blocked by the engaging unit 414 and cannot be rotated outward. In other words, with reference to the directions in FIG. 6, the blade 2 is kept from rotating clockwise about an axis defined by the pivot shaft 111. When the pressing unit 411 is subsequently pressed, referring to FIG. 7, the engaging unit 414 is driven into the groove 110 and thus disengaged from the blade 2, that is, the engaging unit 414 is no longer pressed against the outer edge of the blade 2. As a result, the blade 2 is pushed by the elastic bar 3 and rotated out of the handle 1. In other words, with reference to the directions in FIG. 7, the blade 2 is rotated clockwise about the axis defined by the pivot shaft 111. Meanwhile, the second end of the elastic bar 3 is moved outward from the position adjacent to the groove 110 (see FIG. 6) to a position located away from the groove 110 (see FIG. 7).

In certain embodiments, referring to FIG. 1 and FIG. 4, the outer edge of the blade 2 can be concavely formed with a passage-allowing groove 21 that is on the same side as the cutting edge and adjacent to one end of the blade 2, and the passage-allowing groove 21 corresponds in position to the groove 110 when the blade 2 is fully stored in the handle 1. When the blade 2 is rotated about its pivotal connection position out of the handle 1, referring to FIG. 7, a portion of the outer edge of the blade 2 passes through an area corresponding to the groove 110. In certain embodiments, a portion of the engaging unit 414 that is adjacent to the passage-allowing unit 413 (e.g., the upper half of the engaging unit 414 in FIG. 5) has an at least trapezoidal (or conical) longitudinal cross section, and the greatest length of this portion in the transverse direction is greater than the distance between any two opposing groove wall portions of the passage-allowing groove 21. Accordingly, when the blade 2 is fully stored in the handle 1 and the pressing unit 411 is not pressed, the engaging unit 414, which is pushed by the elastic element 42, will be extended into the passage-allowing groove 21 and be pressed against the groove wall of the passage-allowing groove 21. The configuration of the upper half of the engaging unit 414 produces a guiding effect that makes it easier for the engaging unit 414 to be extended into the passage-allowing groove 21 until the engaging unit 414 is effectively pressed against the groove wall of the passage-allowing groove 21 to block the blade 2 and thereby prevent the blade 2 from being moved by the pushing force of the elastic bar 3. When the pressing unit 411 is subsequently pressed, the engaging unit 414 will be disengaged from the passage-allowing groove 21, leaving only the passage-allowing unit 413 in the passage-allowing groove 21, and as shown in FIG. 7, since the passage-allowing unit 413 has a smaller diameter and therefore will not be touched by the blade 2 when the blade 2 is being rotated about its pivotal connection position out of the handle 1, the blade 2 can be rotated out of the handle 1 smoothly and rapidly.

Figure 8:
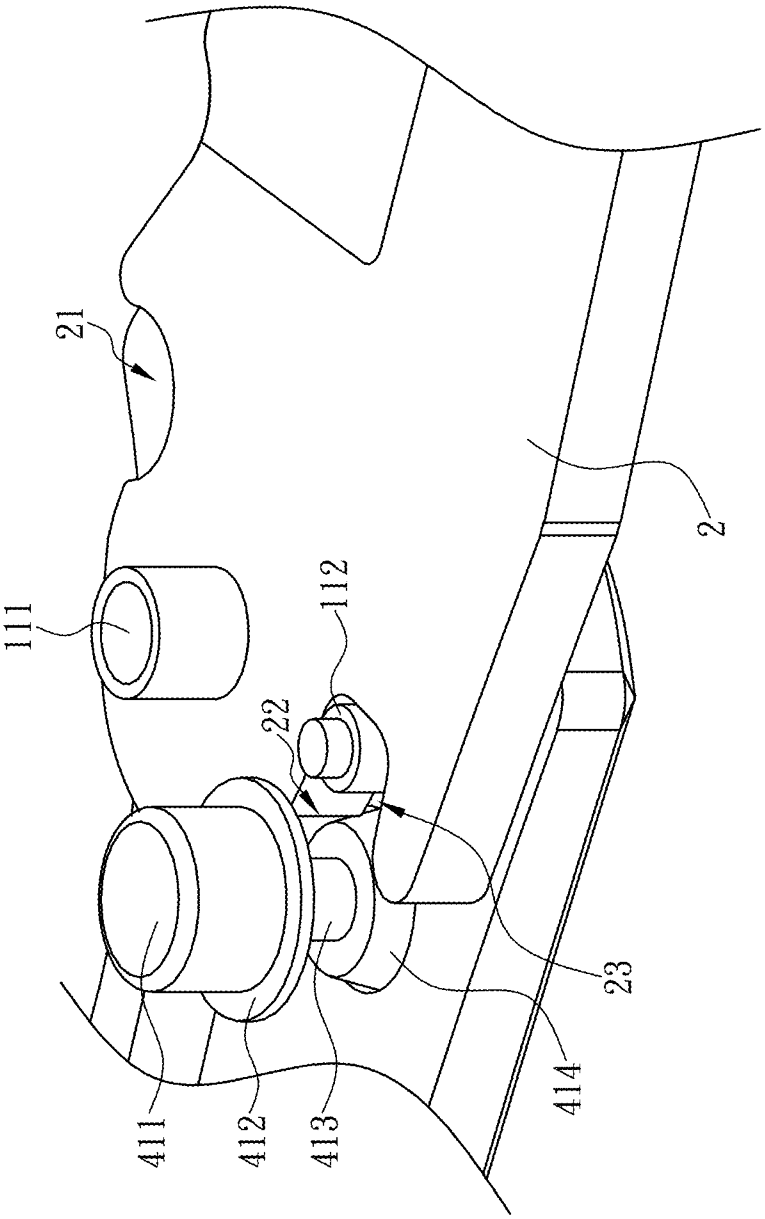
FIG. 8 is a perspective view of a portion of the folding knife that is fully unfolded according to certain embodiments of the present disclosure, omitting the second plate thereof.

Referring to FIG. 1 and FIG. 8, the outer edge of the blade 2 can be concavely formed with an engaging groove 22 that is on the same side as the back of the blade 2 and adjacent to one end of the blade 2, i.e., with the engaging groove 22 and the passage-allowing groove 21 located on two opposite sides of the blade 2, respectively. The groove wall configuration of the engaging groove 22 matches the configuration of the engaging unit 414 so that when the blade 2 has been rotated fully out of the handle 1 and the pressing unit 411 is not pressed, the engaging unit 414, which is pushed by the elastic element 42, will be pressed against the groove wall of the engaging groove 22 to block the blade 2 and thereby prevent the blade 2 from rotating inward. However, the present disclosure is not limited thereto. In certain embodiments, the blade 2 may dispense with the engaging groove 22, and use only a part of the outer edge of itself for the blocking by the engaging unit 414. In addition, the inner side of the first plate 11 can be protrudingly provided with a stop post 112, with the blade 2 concavely formed with a stop groove 23 at a position adjacent to the engaging groove 22 so that when the blade 2 is rotated fully out of the handle 1, the stop post 112 will be extended into the stop groove 23 and abut the groove wall of the stop groove 23 to prevent the blade 2 from over-rotation and hence from deviating from the working-unfolded state shown in FIG. 2.

Figure 9A:
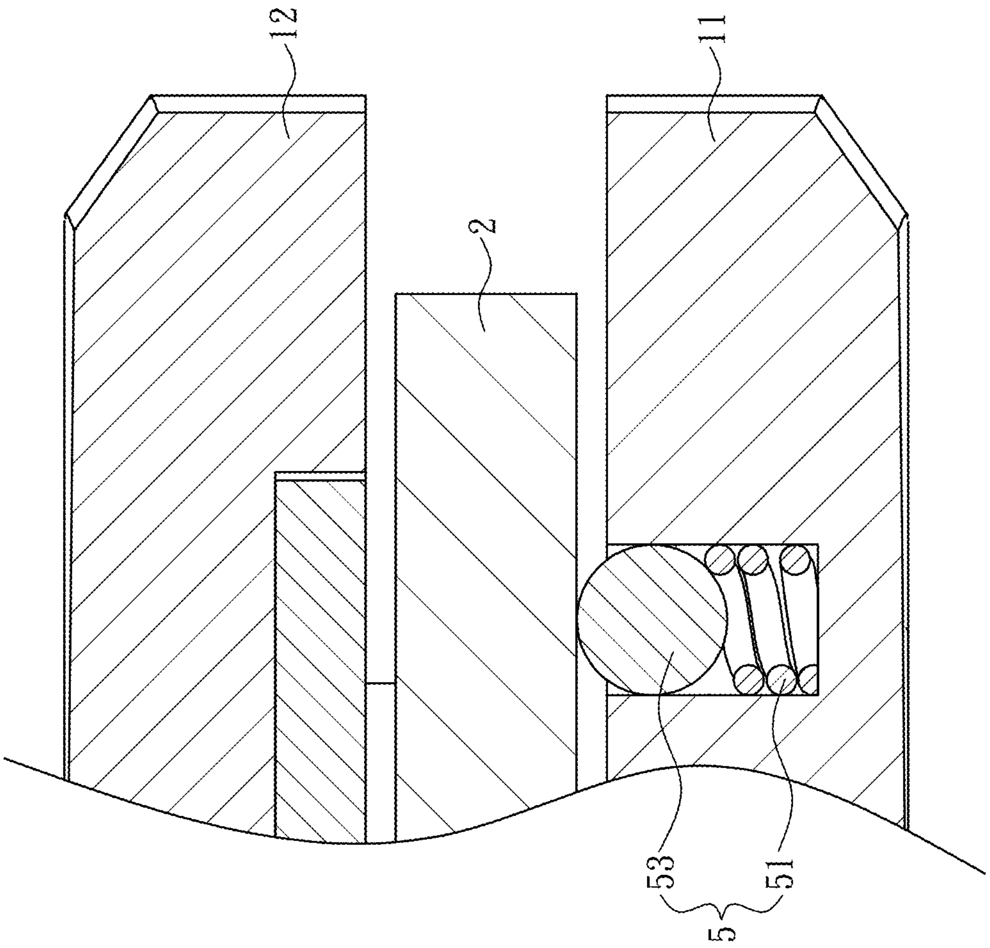
FIG. 9A is a cross-sectional view of a positioning portion being compressed according to certain embodiments of the present disclosure.
Figure 9B:
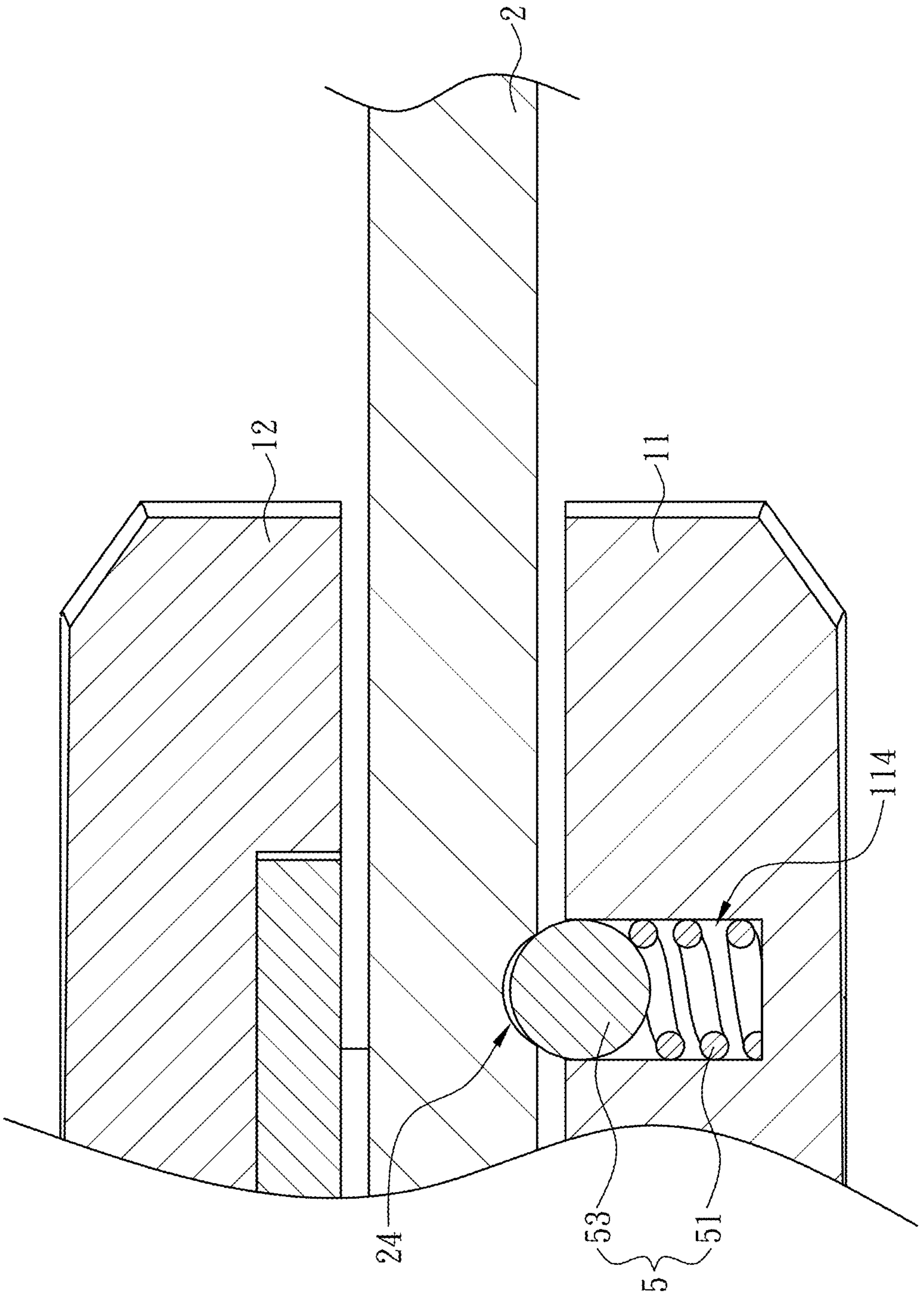
FIG. 9B is a cross-sectional view of the positioning portion being extended into a second positioning groove according to certain embodiments of the present disclosure.

Referring to FIG. 1, the handle 1 is further formed with a first positioning groove 114, and the blade 2 is formed with a second positioning groove 24. When the blade 2 is in the working-unfolded state shown in FIG. 2, the second positioning groove 24 corresponds to the first positioning groove 114. In certain embodiments, the first positioning groove 114 is in the inner side of the first plate 11. However, the present disclosure is note limited thereto. In certain embodiments, the first positioning groove 114 may be in the inner side of the second plate 12 instead. Moreover, the second positioning groove 24 and the first positioning groove 114 do not necessarily have the same size and shape, as long as the second positioning groove 24 and the first positioning groove 114 are at least partially in communication with each other when the second positioning groove 24 corresponds to the first positioning groove 114. Referring to FIG. 9A and FIG. 9B, the positioning portion 5 can be disposed in the first positioning groove 114 and has an elastic restoring force that allows the positioning portion 5 to be compressed along a direction inward of the first positioning groove 114 and to be extended into the second positioning groove 24.

With continued reference to FIG. 1, FIG. 9A, and FIG. 9B, the positioning portion 5 includes an elastic member 51 and a positioning block 53. In certain embodiments, the elastic member 51 and the positioning block 53 are two independent elements. For example, the elastic member 51 is a spring while the positioning block 53 is a ball (e.g., a steel ball). The elastic member 51 can be disposed in the first positioning groove 114 and has an elastic restoring force, and the positioning block 53 is located at the top end of the elastic member 51 (with reference to the directions in FIG. 9A) and can be pushed and displaced by the elastic member 51. When the second positioning groove 24 does not correspond to the first positioning groove 114, as shown in FIG. 9A, the positioning block 53 is pressed by the blade 2 and thus moved inward of the first positioning groove 114. When the second positioning groove 24 corresponds to the first positioning groove 114, as shown in FIG. 9B, the positioning block 53 can be driven by the elastic member 51 to be extended into the second positioning groove 24.

Figure 10A:
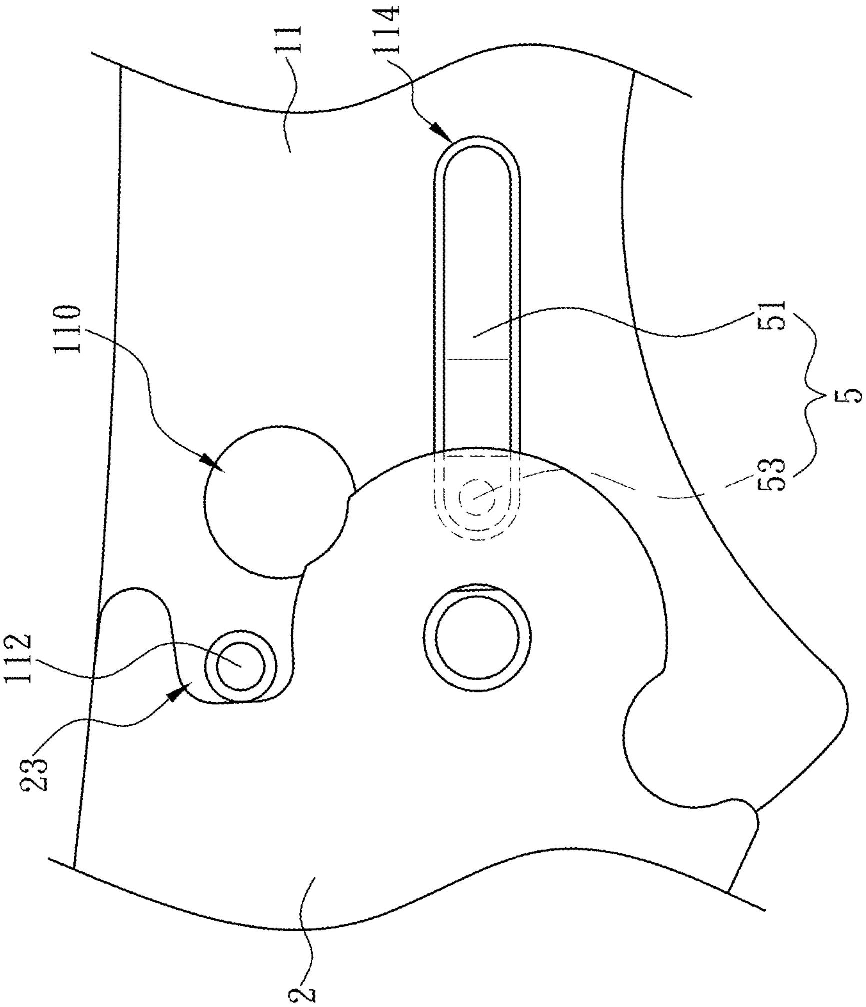
FIG. 10A is a schematic diagram of a positioning portion according to certain embodiments of the present disclosure.
Figure 10B:
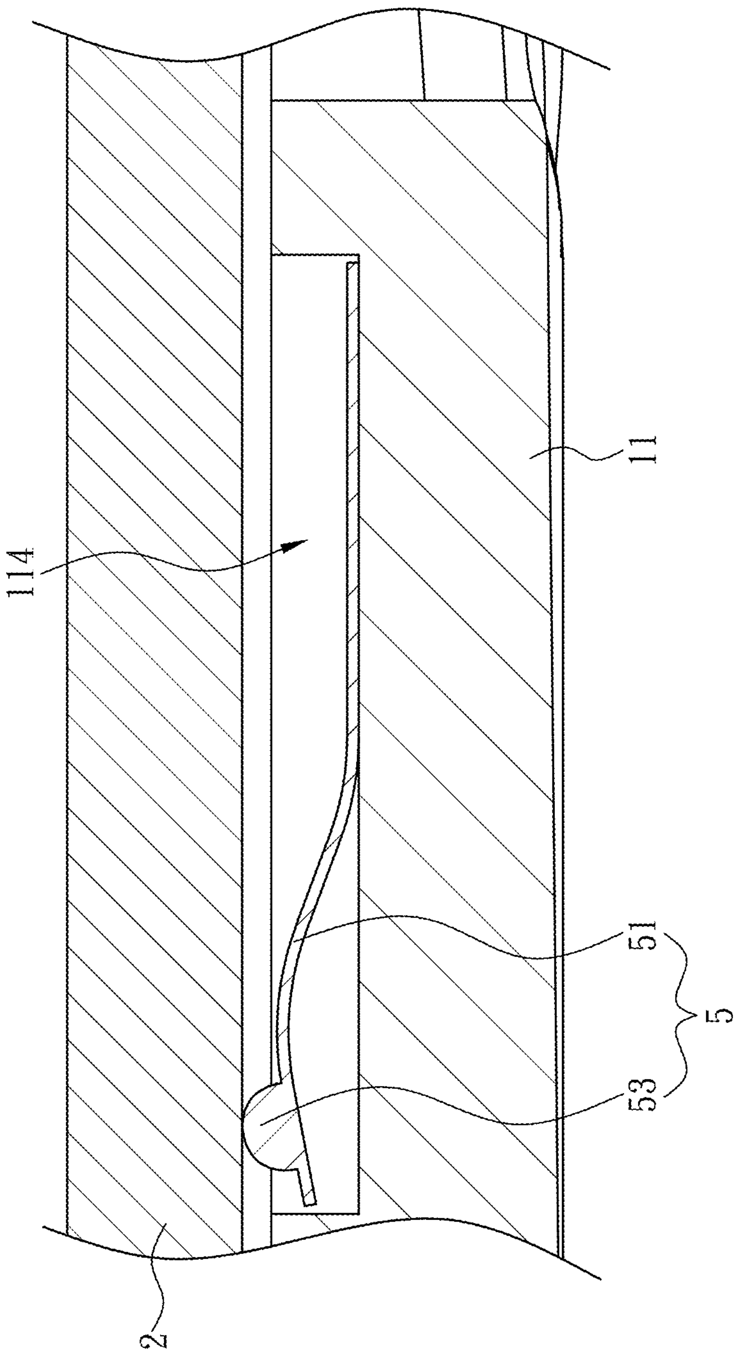
FIG. 10B is a cross-sectional view of the positioning portion being compressed according to certain embodiments of the present disclosure.
Figure 10C:
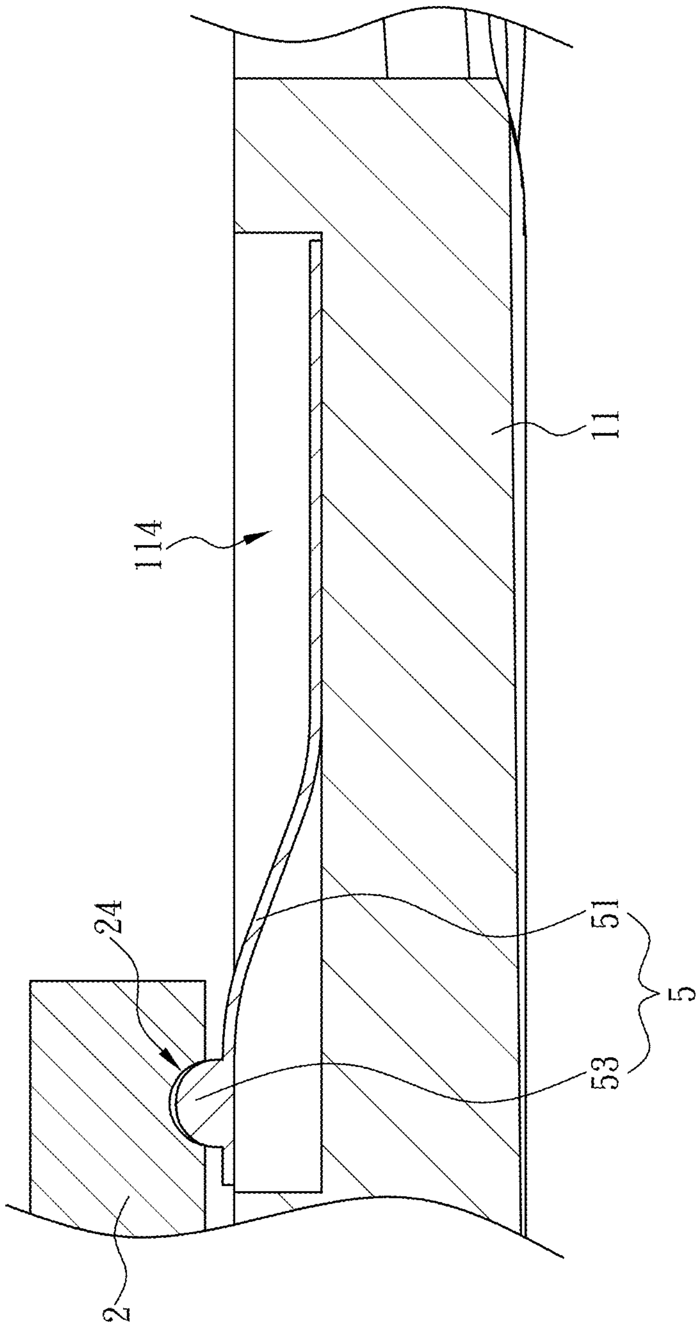
FIG. 10C is a cross-sectional view of the positioning portion being extended into a second positioning groove according to certain embodiments of the present disclosure.

In certain embodiments, referring to FIG. 10A to FIG. 10C in conjunction with FIG. 1, the elastic member 51 and the positioning block 53 form a single element, wherein the single element may be integrally formed of the elastic member 51 and the positioning block 53, formed by coupling the elastic member 51 and the positioning block 53 together, etc. The elastic member 51 in certain embodiments is formed by bending or curving a plate (e.g., a metal plate) at a specific angle and has an elastic restoring force. The term "specific angle" refers to an angle at which the plate is bent or curved to form the elastic member 51 that allows one end of the bent or curved plate to be displaced in space when subjected to an applied force and will return to its original position when the applied force is removed. The positioning block 53 in certain embodiments is integrally formed at one end of the plate (i.e., the elastic member 51) and can be driven into displacement by the elastic member 51. When the second positioning groove 24 does not correspond to the first positioning groove 114, as shown in FIG. 10B, the positioning block 53 is pressed by the blade 2 and thus moved inward of the first positioning groove 114. When the second positioning groove 24 corresponds to the first positioning groove 114, as shown in FIG. 10C, the positioning block 53 can be driven by the elastic member 51 to be extended into the second positioning groove 24.

Referring to FIG. 9A to FIG. 10C in conjunction with FIG. 1, when the folding knife K is opened such that the blade 2 is in the working-unfolded state (as shown in FIG. 2), the blade 2 is limited by the positioning portion 5, blocked by the engaging unit 414 (as shown in FIG. 8), and thus stably kept in the current state (the working-unfolded state). When it is subsequently desired to store the folding knife K, the user only has to press the pressing unit 411 to disengage the engaging unit 414 from the engaging groove 22, and the blade 2 will be able to be rotated and stored by the user applying a force to overcome the elastic restoring force of the positioning portion 5. Preferably, a portion of the exterior of the positioning block 53 has a curved contour so that when the user applies a force to rotate the blade 2, the curved contour will allow the positioning block 53 to be disengaged from the second positioning groove 24 with relatively great ease, thereby adding to the convenience of storage. It should be pointed out that when being extended into the second positioning groove 24, the positioning block 53 may be in substantially close contact with the groove wall of the second positioning groove 24 or be spaced apart from the groove wall of the second positioning groove 24.

According to the above, the folding knife K is structured to produce the following effects:

(1) As shown in FIG. 1, the elastic bar 3 is so designed that a user only has to press the pressing unit 411, and the blade 2 will be rotated out automatically because of the force applied by the elastic bar 3 to the blade 2. Accordingly, the effects of the folding knife K are equivalent to that of a spring-loaded knife, and the larger volume of the elastic bar 3 (compared with the volume of a volute spring) not only facilitates production and assembly, but also allows an assembler to easily spot whether the elastic bar 3 is properly mounted and positioned, thus contributing to a low fraction defective.

(2) In terms of actual operation, the positioning portion 5 has a limiting effect that helps enhance the stability of the unfolded blade 2 by retaining the blade 2 in the working-unfolded state and preventing the blade 2 from rebounding and wobbling that can occur when the blade 2 is pushed by the elastic bar 3 and rotated out of the handle 1 because of the reaction force produced by collision with another element, for example, when the blade 2 is rotated to the working-unfolded state (as shown in FIG. 2) and collides with the stop post 112 or the groove wall of the engaging groove 22.

(3) Furthermore, when the blade 2 is in the working-unfolded state, the user has to overcome the elastic restoring force of the positioning portion 5 and force the engaging unit 414 out of engagement with the blade 2 or with the groove wall of the engaging groove 22 in order to render the blade 2 rotatable and hence storable. In actual production, however, the engineering tolerance of the engaging unit 414 may result in a smaller area of contact between the engaging unit 414 and the blade 2 (the groove wall of the engaging groove 22) such that the blocking function of the engaging unit 414 is impaired. The design of the positioning portion 5 can secure the blade 2 in the working-unfolded position so that while the user is operating the folding knife K, the blade 2 will stay in the unfolded configuration shown in FIG. 2 to provide enhanced safety of use.

(4) The stop post 112 is designed to prevent the blade 2 from over-rotation and thereby allow the blade 2 to stay at the intended position shown in FIG. 2.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A folding knife, comprising:

a handle, comprising:

a first plate, wherein an inner side of the first plate is concavely formed with a groove; and a second plate formed with a through hole corresponding in position to the groove, wherein the first plate or the second plate is formed with a first positioning groove;

a blade configured to be located between the first plate and the second plate and having:

a pivotal connection end configured to be pivotally connected to a position of the handle that is adjacent to a first end of the handle, wherein the blade is configured to be rotated out of the handle and rotated into the handle around the position where the handle and the blade are pivotally connected;

a blade tip end;

a passage-allowing groove configured to correspond in position to the groove of the first plate when the blade is fully stored in the handle, wherein a protruding tip is defined between and connected both to the passage-allowing groove and a side surface of the blade that faces the handle when the blade is stored in the handle; and a second positioning groove configured to correspond to the first positioning groove when the blade is rotated out of the handle and in an unfolded state;

an elastic bar having a first end located at a position of the handle that is adjacent to a second end of the handle, and a second end at a position adjacent to the position where the handle and the blade are pivotally connected, and configured to, when the blade is fully stored in the handle, press against the protruding tip defined between and connected both to the passage-allowing groove and the side surface of the blade and apply a rotating force to the blade that pushes the blade along a direction out of the handle;

a positioning portion configured to be disposed in the first positioning groove and, when the second positioning groove corresponds to the first positioning groove, be extended into the second positioning groove and prevent the blade from rebounding because of a reaction force; and an engaging portion comprising:

an engaging post comprising:

a pressing portion configured to be extended into the through hole from an inner side of the second plate and be exposed from an outer side of the second plate;

a position-limiting portion, wherein a greatest length of the position-limiting portion in a transverse direction is greater than a hole diameter of the through hole, so as to prevent the engaging post from separating from the through hole;

an engaging portion configured to be extended into the groove of the first plate and, when the pressing portion is pressed, be disengaged from the blade and prevented from being pressed against an outer edge of the blade, so that the blade is pushed by the elastic bar and rotated out of the handle till the positioning portion is extended into the second positioning groove, and a portion of the outer edge of the blade passes through an area corresponding to the groove of the first plate while the blade is being rotated outward; and a passage-allowing portion, wherein a greatest length of the passage-allowing portion in the transverse direction is less than a greatest length of the engaging portion in the transverse direction; and an elastic element located in the groove of the first plate and configured to:

push the engaging portion in a direction away from the groove of the first plate; and when the blade is stored in the handle and the pressing portion is not pressed, push the engaging portion and press the engaging portion against the outer edge of the blade, so that the blade is blocked by the engaging portion and prevented from being rotated outward.

2. The folding knife according to claim 1, wherein the engaging portion is configured to be extended into the passage-allowing groove and pressed against a groove wall of the passage-allowing groove when the pressing portion is not pressed and the blade is stored in the handle, and be disengaged from the passage-allowing groove and leave the passage-allowing portion in the passage-allowing groove when the pressing portion is pressed, and the passage-allowing portion is configured to allow passage of the blade without being touched by the blade when the blade is rotated out of the handle around the position where the handle and the blade are pivotally connected.

3. The folding knife according to claim 1, wherein a portion of the engaging portion that is adjacent to the passage-allowing portion has a trapezoidal longitudinal cross section, and a greatest width of the engaging portion is greater than a distance between any two opposite sidewall portions of the passage-allowing groove.

4. The folding knife according to claim 1, wherein an engaging groove is concavely formed at a lateral edge of the blade, and the elastic element is configured to, when the blade is rotated fully out of the handle and the pressing portion is not pressed, push the engaging portion and press the engaging portion against a groove wall of the engaging groove, so that the blade is blocked by the engaging portion from inward rotation.

5. The folding knife according to claim 4, wherein the inner side of the first plate is protrudingly provided with a stop post, the blade is concavely formed with a stop groove at a position adjacent to the engaging groove, and the stop post is in the stop groove and abuts a groove wall of the stop groove when the blade is rotated fully out of the handle.

6. The folding knife according to claim 1, wherein the positioning portion comprises:

an elastic member configured to be disposed in the first positioning groove and having an elastic restoring force; and a positioning block configured to be pushed and displaced by the elastic member, be driven by the elastic member to be extended into the second positioning groove when the second positioning groove corresponds to the first positioning groove, and be pressed by the blade and moved inward of the first positioning groove when the second positioning groove does not correspond to the first positioning groove.

7. The folding knife according to claim 6, wherein the elastic member is a spring, and the positioning block is a ball.

8. The folding knife according to claim 6, wherein the elastic member and the positioning block are integrally formed, and the elastic member is formed by bending or curving a plate at a specific angle and has the elastic restoring force.

* * * * *